Patented Aug. 14, 1951

2,563,991

UNITED STATES PATENT OFFICE 2,563,991

PROCESS FOR THE PREPARATION OF AN EMULSION PAINT

Emile Vital Damboise, Paris, France

No Drawing. Application August 4, 1947, Serial No. 766,096. In France April 26, 1940

7 Claims. (Cl. 106—130)

The object of the invention is to provide a paint adapted to lend itself to the following combinations:

Used as such or added with a pigment ground in oil, it is adapted upon application to provide a uniform layer. When admixed with a pigment ground in water, it provides a layer in which two color intensities of the added pigment appear to be juxtaposed. There is obtained in this way, in a single application of paint, a two-tone cameo effect. Finally, when the paint base according to the invention is admixed with two pigments one of which is ground in oil and the other one in water, it provides a coating wherein both colours of the added pigments appear to be juxtaposed while remaining separate from each other. In this way, there is obtained in a single application of paint a two-colour varicolored effect.

In the case of a cameo or varicolor effect, the distribution of the different intensities or color areas may be varied ad infinitum according to, the manner in which the layer is worked. Thus for instance, tapping the layer with the brush has the effect of causing the oily component of the paint to stand out in the areas thus tapped.

The paint base according to my invention may be prepared as follows.

First an oily component and an aqueous component are separately prepared.

The oily component is obtained by grinding of white pigment in a drying oil so as to form a paste which is diluted with turpentine or any other appropriate solvent.

The aqueous component is formed by a white pigment which may be the same as above or a different one and which is ground into water. It is stabilized by means of a colloid such as potato starch, preferably caused to swell with an alkali.

A gelatine solution and then Formol are added. The latter product is allowed to act on the gelatine for a certain period of time, and then the oily component is slowly incorporated into the aqueous component with constant agitation. In this way a stable white emulsion is formed which has the consistency of a thick cream.

Said emulsion admixed if desired with a coloured pigment ground in oil forms a paint which upon application provides a smooth matt layer.

When to this base emulsion there is added a pigment ground in water a major proportion of the latter pigment passes into the aqueous component or phase. The distribution of the pigment depends up to a certain limit on the stabilizing colloid content in the aqueous component or phase of the emulsion. The paint obtained makes it possible to obtain in a single application a layer having a two-tone cameo effect.

Finally, if there is incorporated with the base emulsion, a water-ground pigment on the one hand, and an oil-ground pigment on the other hand there is formed a paint which in a single application provides a varicoloured coating wherein areas showing the color of one of the pigments alternate with areas showing the color of the other pigment.

Example

To form the aqueous component or phase, there is first prepared a starch paste comprising 10 kilograms of potato starch and 80 litres of water admixed with 300 grams of caustic soda and 40 grams of sodium perborate. The paste is brought to the boil in a cauldron provided with a mechanical agitator, then 3 kilograms of resinous soap are added. The mixture is allowed to cool and 1.5 kilograms of gelatine is gradually added preferably in the form of bone-glue. It is desirable that said glue should contain about 25% of its own weight of ground bone, this appearing to exert a bleaching effect and improve the texture of the paint. A preservative may also be added, such for instance as the commercial product known by the name of "Orthophenol" in the amount of 100 grams. The mixture is allowed to cool completely, which requires about 24 hours.

On the other hand, the base-pigment of the aqueous component or phase is prepared by grinding it in water. Essentially, any white pigment may be used such as white lead, lithopone etc. but it is preferable to use a mixture of 36 kilograms of titanium oxyde and 36 kilograms of whiting in 27 liters of water. To the pigment ground in water, the jellified starch paste is slowly incorporated with constant agitation. Then, while continuing the agitation, 600 grams of Formol are slowly added.

There is prepared an additional dose of 1.5 kilograms gelatine containing ground bone as indicated above, dissolved in 21 litres of water at about 50° C. This is slowly added to the mixture which assumes the consistency of a thick cream.

On the other hand there has been prepared the oily component by grinding 143.5 kilograms of lithopone or zinc oxyde in 23 kilograms linseed oil and diluting the paste with 15-20 kilograms turpentine or shell solvent No. 20, the latter having the additional advantage of acting as a deodorizer.

The oily component is incorporated with the aqueous component after the Formol has sufficiently acted upon the gelatine in the latter component. At a temperature of about 10 to 15° C. a few minutes time is sufficient for this action.

The emulsion of paint has a consistency of thick cream; it is stable and does not segregate into its constituents, even after a prolonged period of standing. Whether or not admixed with a pigment ground in oil it constitutes a paste which is easy to spread, dries rapidly and possessing a high covering power, so that a single layer is generally sufficient.

For a cameo effect, there is added to 10 kilograms of the emulsion, 600 grams of a pigment of the desired color ground in 1.400 grams of water.

When a varicoloured effect is desired, there is added 10 kilograms of the emulsion of 300 grams of one of the coloured pigments ground in 700 grams water and of 200 grams of the other pigment ground in 200 grams linseed oil.

What I claim is:

1. A process for preparing an emulsion paint, which comprises grinding a white pigment in a drying vegetable oil, grinding a white pigment in water in the presence of a protecting hydrophilic colloid, and then forming an emulsion by mixing the oily and aqueous suspensions thus obtained.

2. A process for preparing an emulsion paint, which comprises grinding a white pigment in a drying vegetable oil, grinding a white pigment in water in the presence of a protecting hydrophilic colloid, forming an emulsion by mixing the oily and aqueous suspensions thus obtained, grinding a colored pigment in a drying vegetable oil, and then incorporating the resulting colored oily suspension to said emulsion.

3. A process for preparing an emulsion paint, which comprises grinding a white pigment in a drying vegetable oil, grinding a white pigment in water in the presence of a protecting hydrophilic colloid, forming an emulsion by mixing the oily and aqueous suspensions thus obtained, grinding a colored pigment in water and incorporating the resulting colored aqueous suspension to said emulsion.

4. A process for preparing an emulsion paint, which comprises grinding a white pigment in a drying vegetable oil, grinding a white pigment in water in the presence of a protecting hydrophilic colloid, forming an emulsion by mixing the oily and aqueous suspensions thus obtained, grinding a colored pigment in a vegetable drying oil, grinding a colored pigment in water, and then incorporating the resulting oily colored suspension and aqueous colored suspension to said emulsion.

5. A process as set forth in claim 1 wherein said white pigment oily suspension is diluted by a solvent prior to its mixture with said white pigment aqueous suspension.

6. A process as set forth in claim 1 wherein said protecting hydrophilic colloid comprises gelatine, starch in solution and a resinous soap.

7. A process for preparing an emulsion paint, which comprises grinding a white pigment in a vegetable drying oil, grinding a white pigment in water in the presence of gelatine as a protecting hydrophilic colloid, forming an emulsion by mixing the oily and aqueous suspensions thus obtained, and then adding thereto a preservative.

EMILE VITAL DAMBOISE.

No references cited.